May 12, 1942.  E. A. KEELER  2,282,480
MEASURING AND CONTROL APPARATUS
Filed March 31, 1938
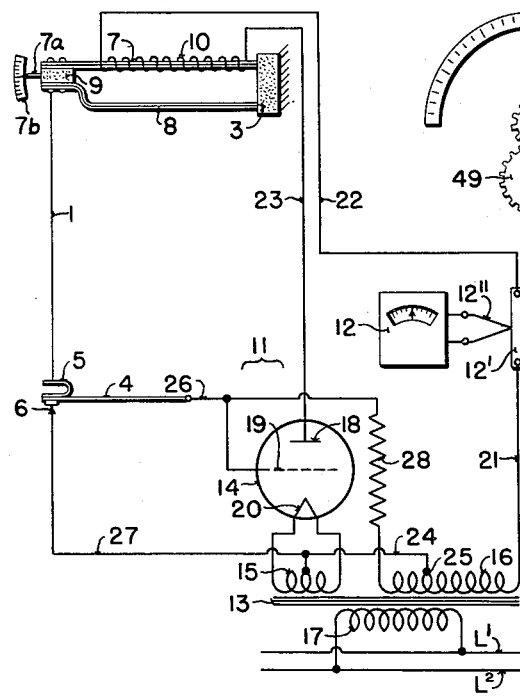
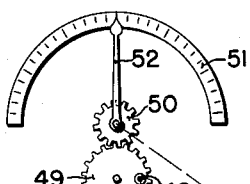
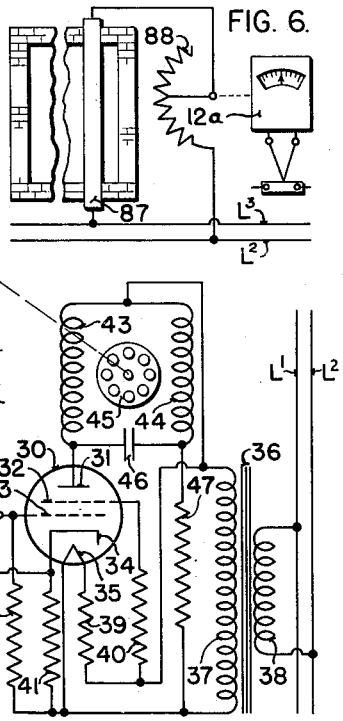
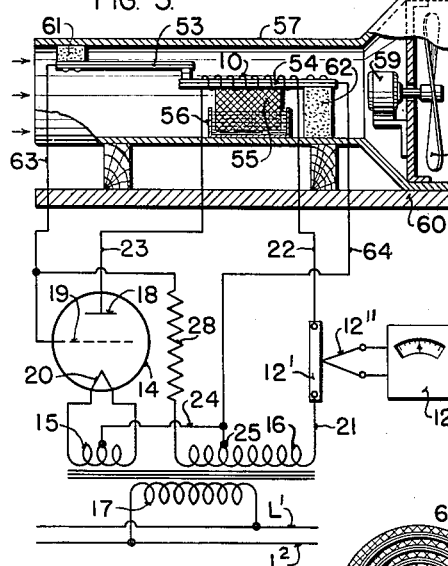
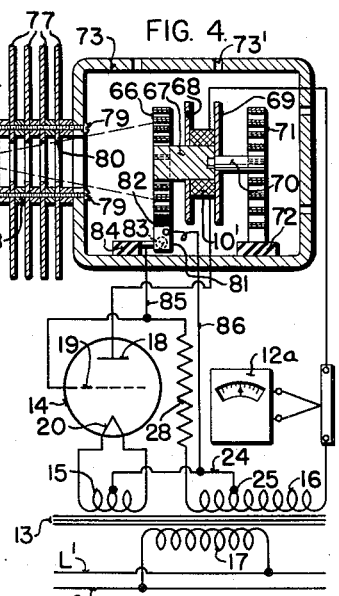
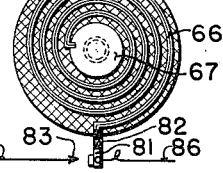
INVENTOR.
EARL A. KEELER
BY George M Muncharp
ATTORNEY.

Patented May 12, 1942

2,282,480

UNITED STATES PATENT OFFICE 2,282,480

MEASURING AND CONTROL APPARATUS

Earl A. Keeler, Norristown, Pa., assignor to The Brown Instrument Company, Philadelphia, Pa., a corporation of Pennsylvania Application March 31, 1938, Serial No. 199,118

9 Claims. (Cl. 177—351)

This invention relates to instrumentalities useful in measuring and/or controlling variations in physical conditions such as humidity, temperature, and the like, and more particularly to instrumentalities of this character which employ electronic valves.

A general object of the invention is to provide measuring and/or controlling apparatus, of the type referred to above, which is characterized by its simplicity and effectiveness, and may be operated directly from a commercial source of alternating current.

A further and more specific object of the invention is to provide measuring and/or controlling apparatus of the character described above in which a device carrying a contact is biased, by an element responsive to variations in the condition under measurement, towards or away from a predetermined position in which the said contact is in chattering engagement with a relatively fixed contact, and a measure of the condition is had by ascertaining the force necessary to restore and maintain the said device in said predetermined position.

A still more specific object of the invention is to provide an instrument of the type referred to above in which the maximum current flow required between the instrument contacts referred to is an extremely small value whereby arcing and sticking of the contacts will be a minimum.

The various features of novelty which characterize my invention are pointed out with particularity in the claims annexed to and forming a part of this specification. For a better understanding of the invention, however, its advantages and specific objects attained with its use, reference should be had to the accompanying drawing and descriptive matter in which I have illustrated and described preferred embodiments of the invention.

Of the drawing:

Fig. 1 is a more or less diagrammatical view illustrating the invention as adapted for use as a hygrometer;

Figs. 2 and 3 illustrate modifications of the arrangement of Fig. 1;

Fig. 4 is a diagrammatic illustration of the invention as adapted for use as a radiation pyrometer;

Fig. 5 illustrates in detail the radiation responsive element of Fig. 4; and

Fig. 6 is a diagrammatic representation of the use of the invention in a control system.

The embodiment of my invention illustrated in Fig. 1 of the accompanying drawing comprises an instrument for measuring and exhibiting the degree of moisture in an enclosure or other space responsively to the expansion or contraction of a strand of suitable animal or vegetable fibre having the property of varying in length when subjected to varying hygroscopic conditions. Human hair, for example, has this property of changing in length in accordance with the amount of moisture in the atmosphere thereabout, and in Fig. 1, I have shown a strand of human hair I suspended at one end from a device 2, to be described, which is fixedly mounted on a stationary bracket 3. Hair element I supports a switch member 4 at the other end thereof, and is connected thereto by means of a spring 5 which may be manually bent and is provided for facilitating the adjustment of the position of switch member 4.

Switch member 4 is positioned in cooperative relation with a stationary contact member 6 and is adapted to move into and out of engagement with the latter accordingly as the length of hair element I becomes greater or less than a predetermined value responsively to changes in the moisture of the atmosphere surrounding it. In referring to a length of "predetermined value" of hair element I, I contemplate a value which is automatically and continuously reset and which is desirably reset through the action of the measuring apparatus itself. For example, on a change in the moisture content of the atmosphere surrounding hair element I and a consequent change in the length of the latter, the switch member 4 is actuated into or out of engagement with the contact member 6, and as a result of such engagement or disengagement, the device 2 is actuated, by means to be described, in an upward or downward direction as required to compensate for the change in length of hair element I to thereby restore the switch member 4 to its normal positional relation with the contact member 6.

The positional relation that normally exists between contact members 4 and 6 is such that these members are in chattering engagement so that normally the periods during which the device 2 is successively energized for operation in opposite directions are so brief that the device 2 is given no movement of significant extent. Upon the occurrence of a change in the length of hair element I, however, the engagement or disengagement of contact members 4 and 6 is sustained for a longer period whereby the device 2 will be actuated in the proper direction to restore the normal chattering relation between the contact members.

The device 2 may be termed a "heat motor" for reasons which will become apparent and includes a pair of bimetallic strips 7 and 8 both of which are secured by an end to the stationary bracket 3 and separated from each other by a suitable distance. The free ends of the strips 7 and 8 are joined by a fibre or other heat insulating spacer 9. The strips 7 and 8 are each composed of two metals having different temperature coefficients of expansion which are welded, riveted, or soldered together along their entire length. Such strips are commonly known as bimetallic elements and have the property of warping when subjected to the influence of heat. The elements 7 and 8 are desirably so connected to the spacer 9 that they are free to move longitudinally with respect to the spacer and thereby to warp without restricting the action of each other.

The means referred to above for actuating the device 2 for movement in a direction compensating for a change in the length of hair element 1 includes a heating coil 10 associated with the bimetallic strip 7. Heating coil 10 is connected in the output circuit of an electronic amplifier 11 the current flow through which is adapted to be controlled by the contact members 4 and 6, which, as shown, are connected to the amplifier input terminals. When contact members 4 and 6 are in engagement, amplifier 11 is adapted to supply a predetermined value of current to heating coil 10, but when the contact members are out of engagement, the current supplied coil 10 is materially reduced and may even assume a zero value. Bimetallic strip 7 is so arranged that when coil 10 is energized it warps in an upward or clockwise direction as seen in Fig. 1, and conversely when the heating coil is energized to a lesser extent or totally deenergized, as the case may be, strip 7 is permitted to cool and moves in a downward or counterclockwise direction. It will thus be noted the action of device 2 may be compared to that of a motor and since it is temperature responsive, it may be termed a "heat" motor.

Thus, on a change in the relative humidity of the atmosphere surrounding hair element 1 and a consequent change in the length thereof, the bimetallic strip 7 is heated to a greater or lesser extent depending upon whether the contact members 4 and 6 are sustained in engagement or out of engagement and accordingly warps in an upward or downward direction, and effects a compensating action which restores the contact member 4 to the position in which it is in chattering engagement with the contact 6. As will be clearly apparent, the average current value through heating coil 10 which is required to maintain the bimetallic strip 7 in a position such that the contact member 4 will be in chattering engagement with contact 6 will vary in accordance with the length of hair element 1, and, in this form of my invention, I obtain a measure of the length of hair element 1 and thereby of the degree of moisture of the atmosphere thereabout by measuring the average current value supplied heating coil 10 by means of a meter 12. As illustrated, the current to be measured by the meter 12 is passed through a resistor element 12' and the heat generated in the resistance element generates a voltage in a thermocouple 12", the terminals of which are connected to the meter 12, which actuates the meter and causes deflection of its deflecting element to an extent determined by the magnitude of the current passing through the resistance element 12'. Meter 12 may be a thermocouple ammeter, as shown, or may be a hot wire or other suitable type, and is preferably calibrated in terms of moisture to thereby provide a direct indication of the degree of moisture in the atmosphere surrounding the hair element. It will be apparent the conductors connecting the terminals of the meter 12 to the amplifier 11 may be extended to any desired length thereby permitting the indication of the degree of moisture in which the hair element is exposed at a point remote from the latter.

In instruments employing bimetallic elements it will be apparent to those skilled in the art that changes in the ambient temperature of the atmosphere about the bimetallic strip 7 will cause warping of the latter independently of the heating coil 10 and in order to compensate for such changes in ambient temperature, the bimetallic strip 8 referred to hereinbefore is provided. The strip 8 is preferably composed of the same metals which make up the strip 7, but is reversely arranged with respect to the latter so that on a rise in ambient temperature, for example, the strips will be actuated for movement in opposite directions and consequently no movement of the device 2 will result. With this arrangement, therefore, changes in ambient temperature will have no effect on the accuracy of the instrument.

As illustrated, the amplifier 11 includes a transformer 13 and an electronic valve 14. The transformer 13 supplies power to the system and is a combination step-up and step-down transformer comprising a low voltage secondary winding 15, a high voltage secondary winding 16, and a line voltage primary winding 17 having its terminals connected to alternating current supply conductors $L^1$ and $L^2$.

The electronic valve 14 is shown as a triode type and includes an anode 18, a control grid 19, and a filament cathode 20. The low voltage transformer secondary winding 15 is connected to the filament cathode 20 and supplies energizing current thereto. Anode voltage is supplied valve 14 from the high voltage secondary winding 16 through a circuit which may be traced from the right hand terminal of the winding to a conductor 21, through the resistance element 12', to a conductor 22, the heating coil 10 and therethrough to a conductor 23, the anode 18 and cathode 20 of valve 14, and a conductor 24 to a tap 25 on the transformer secondary winding.

As referred to hereinbefore, the means for controlling the conductivity of valve 14 and thereby the energization of heating coil 10 includes the stationary contact 6 and the cooperating switch member 4. As illustrated, switch member 4 is connected to the control grid 19 by a conductor 26, and the contact 6 is connected by a conductor 27 to a center tap on the low voltage transformer secondary winding 15. When the switch member 4 is out of engagement with contact 6, a potential of such polarity is impressed on the control grid 19 by a portion of the secondary winding 16 through a resistance 28 that the grid potential relative to the cathode potential is such that the conductivity of the valve is a minimum. The circuit employed for so biasing the control grid 19 may be traced from the left hand terminal of the transformer secondary winding 16 to the resistor 28 and therethrough to the control grid 19.

When the contact members 4 and 6 are in engagement, however, it will be noted the bias voltage provided by the secondary winding 16 is shunted out and the potential of the control grid 19 will then be raised to that of the cathode 20 and may even be swung slightly positive with respect to the cathode potential, and as a result, the current conducted by the valve will be materially increased.

It is noted that since an alternating voltage is impressed on the anode circuit of valve 14 that the current conducted thereby will be pulsating. In order to provide a measure of the moisture content of the atmosphere surrounding hair element 1 in terms of the current supplied heating coil 10, a meter capable of indicating average values of current flows, such as meter 12 previously described, must be employed. It should be particularly noted, however, that a pointer 7a attached to the elements 7, 8, as shown in Fig. 1, may serve to indicate on a suitable scale 7b the value of the condition in lieu of or in addition to the meter 12.

In Fig. 2 I have illustrated, more or less diagramatically, a modification of the Fig. 1 arrangement in which the heat motor 2 and meter 12 may be dispensed with and in which the switch member 4 is restored to a position of chattering engagement with the contact 6, on departure therefrom as a result of a change in the length of hair element 1, by a reversible electrical motor 29. In accordance with this arrangement the reversible motor 29 is selectively controlled for rotation in one direction or the other by an electronic valve 30, which in turn, is controlled by the contact members 4 and 6.

Valve 30 is a heater type tetrode preferably of the type known commercially as beam power amplifier valves, for example, a 25L6 type valve, and includes an anode 31, a screen grid 32, a control grid 33, a cathode 34 and a heater filament 35. Energizing voltage is supplied the valve 30 from a transformer 36 which, as shown, includes a secondary winding 37 and a primary winding 38 having its terminals connected to the supply conductors L¹ and L². Energizing current is supplied the filament 35 from the transformer secondary winding 37 through a circuit which may be traced from the lower terminal of the secondary winding to the filament, and a resistor 39 to the upper terminal of the winding. Resistor 39 is employed for limiting the flow of current to the filament 35 and is so chosen that the voltage impressed on the filament will be the desired value. Screen grid 32 is connected to the upper terminal of transformer secondary winding 37 through a resistance 40 of suitable value, and cathode 34 is connected to the lower terminal of the secondary winding through a biasing resistor 41. Control grid 33 is connected to the negative end of resistor 41 through a resistor 42.

Reversible motor 29 is of the well known capacitor induction variety having field windings 43 and 44 spaced in quadrature with each other, and so disposed relatively to a squirrel cage rotor 45 that half of each winding is at diametrically opposite sides of the rotor, and also includes a condenser 46 of suitable capacity. In the normal operation of such motors the magnetic fields set up in the rotor by the windings 43 and 44 have a phase displacement of not more than 90° whereby the fields form together a rotating field such as to cause rotation of the rotor in one direction or the other accordingly as the field set up by the winding 43 is displaced in the forward or the backward direction relatively to the field set up by the winding 44.

Winding 43 is connected in a series circuit with the anode to cathode resistance of valve 30 and the cathode biasing resistor 41 across the transformer secondary winding 37, and winding 44 is connected in a series circuit with a fixed resistor 47 thereacross. Condenser 46 is connected between the anode 31 of valve 30 and the point of connection of resistor 47 and the winding 44. Thus, when the anode to cathode resistance of valve 30 is approximately equal to the resistance of resistor 47, the impedance of the circuit paths including the windings 43 and 44 will be approximately equal so that the terminals of condenser 46 will be at the same potential. As a result the magnetic fields set up by the windings 43 and 44 will be approximately in phase and consequently the rotor 45 will remain stationary. When the anode to cathode resistance of valve 30 is increased or decreased, however, the terminals of condenser 46 will be at different potentials so that in effect the condenser will be connected in a series circuit with one motor winding 43 or 44 in shunt to the other motor winding, and as a result the magnetic field set up by one motor winding will be displaced in the forward or backward direction with respect to the magnetic field set up by the other winding and the rotor 45 will be actuated for rotation in a corresponding direction.

The means for controlling the conductivity of valve 30 includes a pair of contacting members 4 and 6 which may be identical to the correspondingly identified parts of Fig. 1. Switch member 4 is connected to the control grid 33 and contact 6 is connected to the positive end of the biasing resistor 41. Switch member 4 is supported from one end of hair element 1 and the upper end of the latter is fixedly connected to a stud 48 carried on the face of a gear 49. Gear 49 is in cooperative relation with a gear 50 and the latter is connected through suitable gearing (not shown) to the rotor 45 of motor 29. Stud 48 is displaced a suitable distance from the axis of rotation of gear 49 so that when gear 50 and consequently gear 49 is rotated in one direction or the other as a result of motor rotation, hair element 1 will be moved in a downward or upward direction, and accordingly switch member 4 will be moved into or out of engagement with contact 6.

Thus, on a change in the length of hair element 1, for example, on an increase thereof, switch member 4 will be moved into engagement with contact 6 to thereby shunt out the negative potential impressed on the control grid 33 by the biasing resistor 41 and accordingly the conductivity of valve 30 is increased. It is noted that when the term conductivity is used in connection with valve 30 the effective conductivity as regards the tendency for energizing motor 29 for rotation is intended. Since an alternating voltage is impressed on the anode circuit of valve 30, the latter will conduct pulsating current and as the amplitude of the pulsating current rises above a predetermined value determined by the magnitude of resistor 47, the rotor 45 of motor 29 will be urged to rotation in one direction or the other and in the case above mentioned, will cause rotation of gear 49 in a counterclockwise direction to thereby move switch member 4 out of engagement with contact 6.

When switch member 4 is out of engagement with contact 6, a negative potential will be impressed on the control grid 33 by the biasing resistor 41 and a decrease in conductivity of valve 30 will result whereupon motor 29 will be energized for rotation in the opposite direction. Switch member 4 will then again move into engagement with contact 6 and motor 29 will be energized for rotation in the opposite direction. As will be clearly apparent, the system will quickly come to an equilibrium condition in which the contact members 4 and 6 are in chattering engagement and motor 29 will then be actuated for rotation in opposite directions in rapid alternation and will remain stationary. Upon an increase or decrease in the length of hair element 1, however, engagement or disengagement of contact members 4 and 6 will be sustained for a substantial interval and accordingly motor 29 will be actuated for rotation in one direction or the other and will cause movement of the switch member 4 in the proper direction to reestablish a chattering engagement between the contacts.

In this arrangement means are provided in the form of a suitably calibrated scale 51 and an associated pointer 52 carried by the gear 50 for indicating the degree of moisture content of the atmosphere to which the hair element 1 is subjected.

In Fig. 3 I have illustrated a further modification of the Fig. 1 arrangement wherein the hair element 1 and the compensating bimetallic strip 8 may be dispensed with and in which a measure of the degree of moisture in an atmosphere is had by measuring the "wet" and "dry" temperatures of the atmosphere. That is to say, a temperature measuring element which is dry and from which the evaporation of moisture is negligible, and a temperature measuring element which is maintained in a moistened state, and from which moisture will evaporate at a rate determined by the moisture content of the atmosphere to which the elements are subjected, are provided for obtaining a measure of the relative humidity of that atmosphere.

The "dry" temperature measuring element referred to comprises a bimetallic strip 53, and the "wet" temperature measuring element comprises a bimetallic strip 54 which is maintained in a moistened state by virtue of a wick 55 which dips into water contained in a vessel 56. The elements 53 and 54 may be enclosed in the space the humidity of which is under measurement, but for purposes of obtaining an average measure in a large enclosed space, they may be placed in a casing 57 through which gas is drawn from that space by a fan 58 driven by a motor 59, as illustrated. The casing 57 may be mounted on a suitable base 60, which may be supported in the enclosure or space (not shown) which contains the gas to be tested for humidity.

As illustrated, element 53 is fixedly mounted by its left hand end to an insulating block 61 and element 54 is fixedly mounted by its right hand end to an insulating block 62. Blocks 61 and 62 are supported in any convenient manner in the casing 57. The other ends of elements 53 and 54 are provided with contacts which are moved into and out of engagement with each other as the moisture content of the gas passing through casing 57 changes.

Element 53 is connected by a conductor 63 to the control grid 19 of an electronic valve 14 and element 54 is connected by a conductor 64 to the cathode 20 thereof so that as the elements move into and out of engagement with each other the conductivity of valve 14 is varied.

When the relative humidity of the gas passing through the casing 57 is low, evaporation from the wick 55 will assist the dissipation of heat from element 54, and thereby maintain the warping of the element at a lower degree than would be the case if its temperature were allowed to rise. Since the evaporation from element 53 is small, however, the temperature of the latter will remain substantially constant if a constant temperature prevails and notwithstanding changes in humidity. When the relative humidity rises, however, evaporation from wick 55 will decrease with a resulting decrease in the rate of dissipation of heat therefrom and consequently the temperature of the element 54 will rise, and the degree to which it is warped will increase.

In order to compensate for changes in relative humidity with changes in temperature of the gas, the bimetallic strips 53, and 54 are so constructed that on a given temperature rise, the strip 54 will warp to a greater degree than the strip 53, and the extent to which it does is precisely that required to compensate for the change in relative humidity occurring as a result of the temperature change.

A heating coil 10 connected in the output circuit of valve 14 is provided for so heating element 54 that on a change in temperature of the latter as a result of a change in the relative humidity of the gas, the temperature of the element 54 will be restored to that value in which the element 54 is in chattering engagement with the element 53. In other words, elements 53 and 54 are normally in chattering engagement but upon a change in the relative humidity of the gas passing through casing 57 and a resulting sustained engagement or disengagement of the elements, the heating effect of coil 10 will be changed in the proper direction to so actuate element 54 that a chattering engagement between the elements will be restored. It will be clear the supply of energizing current to coil 10 will then provide a measure of the relative humidity of the gas drawn through casing 57, and a direct indication thereof may be had by measuring that current by a suitably calibrated meter 12.

In Fig. 4 I have illustrated, more or less diagrammatically, another advantageous use of my invention in which a measure of the temperature of a hot body is had by focussing the radiant energy emanating from a furnace 65 onto an expansible device 66 and by heating the device by other means and measuring the amount of energy required to be supplied by said other means in maintaining the device at a predetermined degree of expansion. As will be clearly apparent, the amount of energy supplied by the other means referred to will provide a measure of the temperature of the hot body.

The device 66 is a bimetallic element and, as illustrated in detail in Fig. 5, is preferably formed into a spiral which unwinds when its temperature is raised. It will be clear the spiral may be so composed as to wind up tighter when its temperature is raised, but for clarity and definiteness of illustration, the device 66 has been shown as unwinding as its temperature increases.

The device 66 is preferably minute so that it is capable of being well covered by the image of a body of moderate dimensions, and is coated with a substance such as lamp black or its equivalent which absorbs radiation falling on it. It has its inner extremity soldered to a shaft 67 of metal such as silver or copper having a high heat conductivity. Shaft 67 also carries a plate 68 adjacent the device 66 and which is preferably blackened only on the side nearest device 66 and is brightly polished on its other side. The radiation which penetrates between the turns of the spiral 66 is thus received by the plate 68 which imparts by conductivity to the spiral 66.

A heating coil $10^1$ is also carried by the shaft 67 and is positioned between the plate 68 and a second plate 69 carried by the shaft 67 at a point remote from the device 66. The plate 69 is preferably brightly polished on both sides.

It will thus be noted the device 66 is adapted to be heated by the radiation impinging thereon or transmitted thereto by the plate 68, and by the heat transmitted thereto from the heating coil $10^1$. In this form of my invention the energization of the heating of coil $10^1$ is controlled in accordance with the degree of expansion of the device 66 and in such a manner that the temperature of the latter and thereby its expansion is maintained at a predetermined value. In order to compensate for ambient temperature changes the shaft 67 is desirably connected by an extension 70, which is preferably of smaller diameter than the shaft 67 and also of lower heat conductivity, to the inner end of a spiral bimetallic device 71. The outer end of the spiral device 71 is rigidly connected to an insulating block 72 which is secured in any convenient manner to a casing 73 which houses the radiant energy responsive device 66 and the associated parts described. The spiral 71 is so wound and composed as to wind and unwind respectively in opposition to the unwinding and winding of spiral 66 upon ambient temperature changes, the spiral 71 being substantially unaffected by heater $10^1$.

The casing 73 is ventilated by means of openings $73^1$ therein and is carried by a support 74 which is secured to the outer wall or shell of the furnace 65. The support 74 has a central aperture in which is rigidly secured a tube 75 which is adapted to extend into a port or opening 76 in the furnace wall to any desired depth.

In order to limit the radiant energy impinging on the device 66 to that portion of the furnace wall included between the dotted diagonal lines A—B, a stack of plates or shields 77, held apart by means of spacing washers 78, are provided between the furnace 65 and the housing 73. As illustrated, the housing 73 is rigidly secured to the support 74 by means of fastening bolts 79 which pass through the wall of housing 73 adjacent the furnace 65, plates 77, and the spacing washers 78.

As will be apparent, the amount of radiant energy impinging on the spiral device 66 depends upon the temperature of the interior wall of the furnace, but this amount may be adjusted as desired by varying the diameter of the aligned openings 80 in the plates 77, the diameter of the opening in the housing 73 and the diameter of opening in tubes 75. The parts which limit the included angle between the dotted diagonal lines A—B constitute a shield for the device 66 since they shield the latter from undesirable radiation from hot portions of the furnace not within the selected area. The outer surface of tube 75 is preferably polished so that it will absorb a minimum of radiant energy impinging on it. In addition, the transfer of heat energy from tube 75 to the device 66 by conduction is prevented by the plates 77 which are in direct metallic contact with the tube 75 and carry off any heat transferred to them either by radiation or conduction.

As illustrated, the outer end of device 66 carries a contact 81 which may desirably be, although not necessarily so, insulated from the device 66, as by an insulating part 82, and is adapted to engage a stationary contact 83 carried by an insulating block 84 secured in any convenient way to the housing 73. Contact 83 is connected by a conductor 85 to the control grid 19 of an electronic valve 14 and contact 81 is connected by a conductor 86 to the cathode 20 thereof. Valve 14 may be identical to the correspondingly identified part of Fig. 1 and is energized from a transformer 13 as in that arrangement. The heating coil $10^1$ is connected in the output circuit of valve 14 together with an exhibiting meter $12a$ which may be identical to the meter 12 of Fig. 1, but is preferably calibrated in terms of temperature instead of moisture.

The conductivity of valve 14 in this arrangement is controlled by the engagement and disengagement of contacts 81 and 83 in precisely the same manner as the engagement and disengagement of contacts 4 and 6 control the conductivity of valve 14 in the Fig. 1 arrangement. Thus, as the radiant energy impinging on the device 66 changes, causing a change in temperature of the latter and thereby warping from a predetermined position in which the contact 81 is in chattering engagement with the contact 83, the supply of energizing current to heating coil $10^1$ is varied in the proper direction to restore the temperature of the device 66 to its former value and thereby movement back to said predetermined position. It will be apparent the value of current supplied the heating coil $10^1$, as indicated by the meter $12a$, will then provide a measure of the radiation impinging on the device 66 and thereby of the temperature of the interior of the furnace 65.

As will be clear from the description of Fig. 2, the heater $10^1$ of Fig. 4 and its associated control circuit may be eliminated and the motor 29, indicator 51 and associated control circuit of Fig. 2 substituted by adapting the shaft of motor 29 to drive shaft 70 of Fig. 4. With this arrangement, the support 72 for the compensating spiral may be adapted to rotate with the motor shaft and in turn rotate shaft 70.

It will be apparent the apparatus of my present invention may be employed to operate a control valve or rheostat for controlling the humidity of the atmosphere under measurement in the arrangements disclosed in Figs. 1–3, or for controlling the temperature of the furnace under measurement in the arrangement of Fig. 4. For example, as shown in Fig. 6, a furnace 65 to the heat of which the bimetallic element 66 is responsive, is heated by a resistor 87 which is connected to electric supply conductors $L^2$ and $L^3$ through a rheostat 88, the adjustment of which is effected automatically in any well known manner by means responsive to the deflection of the deflecting element of the meter $12a$ from a predetermined position. The mechanical connection of the rheostat 88 to the automatic adjusting means referred to is such as to increase and decrease the supply of electric current to the resistor 87 as the temperature to which the element 66 is responsive drops below or rises above a predetermined temperature.

While in accordance with the provisions of the statutes, I have illustrated and described the best form of embodiment of my invention now known to me, it will be apparent to those skilled in the art that changes may be made in the form of the apparatus disclosed without departing from the spirit of my invention as set forth in the appended claims, and that certain features of my invention may sometimes be used to advantage without a corresponding use of other features.

Having now described my invention, what I claim as new and desire to secure by Letters Patent is:

1. Measuring apparatus including a movable member, a movable support, a device carried by said movable support and responsive to the variations in a variable condition to control the position of said member, said device adapted to be adjusted in position by said support independently of the condition of response thereof and having a mechanical connection with said member, means operable upon departure of said member from a predetermined position to so adjust the position of said support as to reset said member to said predetermined position, means for exhibiting the extent to which said member is reset, a pair of cooperating electrical contacts one of which is moved by said member and the other of which is relatively stationary, and electronic valve means under control of said contacts only continuously controlling said resetting means.

2. Measuring apparatus including a movable member, a movable support, a device carried by said movable support and responsive to the variations in a variable condition to control the position of said member, said device adapted to be adjusted in position by said support independently of the condition of response thereof and having a mechanical connection with said member, means operable upon departure of said member from a predetermined position to so adjust the position of said support as to reset said member to said predetermined position, a pair of cooperating electrical contacts one of which is moved by said member and the other of which is relatively stationary, electronic valve means having an input circuit under control of said contacts only and an output circuit controlling said resetting means, and means to measure the value of current in said output circuit.

3. Measuring apparatus including a movable member, a movable support, a device carried by said movable support and responsive to the variations in a variable condition to control the position of said member, said device adapted to be adjusted in position by said support independently of the condition of response thereof and having a mechanical connection with said member, heat operable means operable upon departure of said member from a predetermined position to so adjust the position of said support as to reset said member to said predetermined position, means for exhibiting the extent to which said member is reset, a pair of cooperating electrical contacts one of which is moved by said member and the other of which is relatively stationary, and electronic valve means under control of said contacts continuously controlling said heat operable means.

4. Measuring apparatus including a movable member, a movable support, a device carried by said movable support and responsive to the variations in a variable condition to control the position of said member, said device adapted to be adjusted in position by said support independently of the condition of response thereof and having a mechanical connection with said member, heat operable means operable upon departure of said member from a predetermined position to so adjust the position of said support as to reset said member to said predetermined position, a heating element associated with said heat operable means, a pair of cooperating electrical contacts one of which is moved by said member and the other of which is relatively stationary, electronic valve means having an input circuit and an output circuit, a connection between said contacts and said input circuit, a connection between said heating element and said output circuit, and means to measure the value of current in said output circuit.

5. Measuring apparatus including a device movable from a predetermined position responsively to variations in a variable condition from a predetermined value, a reversible rotatable motor for resetting said device to said predetermined position independently of said variable condition, a relatively fixed contact, a contact carried by said device and adapted to engage said relatively fixed contact, means for exhibiting the extent to which said device is reset, and electronic valve means under control of said contacts continuously controlling said reversible rotatable motor.

6. Measuring apparatus including a device movable responsively to an effect produced by variations in a variable condition from a predetermined value, reversible rotatable means producing an effect opposing the first mentioned effect, means for measuring the magnitude of said second mentioned effect, a relatively fixed contact, means under control of said device including a contact carried thereby adapted to engage said relatively fixed contact, and electronic valve means under control of said last mentioned means continuously controlling said reversible rotatable means.

7. Measuring apparatus including a device movable responsively to an effect produced by variations in a variable condition from a predetermined value, a pair of electrical contacts one of which is moved by said device, reversible rotatable means controlled by said contacts and adapted to move said movable contact in the opposite sense from that in which it is moved by said device, the means by which said contacts control said reversible rotatable means including electronic valve means having an input circuit under control of said contacts and an output circuit connected to said reversible rotatable means, and means to exhibit the extent to which said contact is moved by said reversible rotatable means.

8. Measuring apparatus including a device movable responsively to an effect produced by variations in a variable condition from a predetermined value, a pair of electrical contacts one of which is moved by said device, a reversible rotating field motor controlled by said contacts and adapted to move said movable contact in the opposite sense from that in which it is moved by said device, the means by which said contacts control said motor including electronic valve means having an input circuit under control of said contacts and an output circuit connected to said motor, and means to exhibit the extent to which said contact is moved by said motor.

9. Measuring apparatus including a device movable responsively to an effect produced by variations in a variable condition from a predetermined value, a pair of electrical contacts one of which is moved by said device, means for moving said movable contact in the opposite sense from that in which it is moved by said device including a reversible rotatable motor controlled by said contacts, the means by which said contacts control said motor including means tending to bias said motor for rotation in one direction and electronic valve means having an input circuit under control of said contacts and an output circuit connected to said motor tending to bias said motor for rotation in the opposite direction, and means to exhibit the extent to which said contact is moved by said motor.

EARL A. KEELER.